United States Patent
Ju

(10) Patent No.: US 7,426,238 B2
(45) Date of Patent: *Sep. 16, 2008

(54) METHOD AND AN APPARATUS FOR RECORDING A DECODED PICTURE SEQUENCE USING VIRTUAL PICTURE

(75) Inventor: Chi-Cheng Ju, Taipei (TW)

(73) Assignee: Mediatek Inc., Hsin-chu (TW)

( * ) Notice: Subject to any disclaimer, the term of this patent is extended or adjusted under 35 U.S.C. 154(b) by 821 days.

This patent is subject to a terminal disclaimer.

(21) Appl. No.: 10/682,970

(22) Filed: Oct. 14, 2003

(65) Prior Publication Data

US 2004/0076235 A1    Apr. 22, 2004

Related U.S. Application Data

(63) Continuation of application No. 09/816,157, filed on Mar. 26, 2001, now abandoned.

(51) Int. Cl.
*H04N 7/12* (2006.01)
(52) U.S. Cl. .............. 375/240.25; 375/240.01
(58) Field of Classification Search ............ 375/240.25, 375/240.16; 348/578
See application file for complete search history.

(56) References Cited

U.S. PATENT DOCUMENTS

| | | | |
|---|---|---|---|
| 5,608,459 A | 3/1997 | Hashimoto et al. | |
| 5,668,599 A | 9/1997 | Cheney et al. | |
| 5,909,224 A * | 6/1999 | Fung | 345/531 |
| 5,959,690 A * | 9/1999 | Toebes et al. | 348/578 |
| 6,339,669 B1 | 1/2002 | Taniguchi | |
| 6,490,324 B1 | 12/2002 | McDade et al. | |
| 2001/0009567 A1 | 7/2001 | Tsuboi | |
| 2002/0061065 A1 | 5/2002 | Moore | |
| 2002/0114395 A1 | 8/2002 | Owen et al. | |
| 2003/0058941 A1 | 3/2003 | Chen et al. | |

OTHER PUBLICATIONS

Jui-Hua Li, et al., "Architecture and Bus-Arbitration Schemes for MPEG-2 Video Decoder," IEEE Transactions on Circuits and Systems for Video Technology, vol. 9, No. 5, Aug. 1999, pp. 727-736.

* cited by examiner

*Primary Examiner*—Gims Philippe
*Assistant Examiner*—Erick Rekstad
(74) *Attorney, Agent, or Firm*—Greenblum & Bernstein, P.L.C.

(57) ABSTRACT

A video decoder, a video reproduction apparatus and a method for decoding and displaying an encoded video data are provided. The video reproduction device is capable of decoding the encoded video data and generating reference pictures and non-reference pictures in accordance with a decode order, and displaying the reference pictures and the non-reference pictures in accordance with a display order. The non-reference pictures are not referred to by any other pictures when the video data is encoded.

23 Claims, 7 Drawing Sheets

| time | (display sequence) second buffer | first buffer | third buffer | decode sequence |
|---|---|---|---|---|
| t 1 | | I 0 | | I 0 |
| t 2 | I 0 ⟵ ——————— I 0 generate the virtual picture of I0 and send to second buffer | | P 3 decode P3 and store decoded P3 into third buffer | P 3 |
| t 3 | B 1 | I 0 | P 3 | B 1 |
| t 4 | B 2 | I 0 | P 3 | B 2 |
| t 5 | P 3 ⟵ ——— P̶ 6̶ ——— decode P6 and store decoded P6 into first buffer | generate the virtual picture of P3 and send to second buffer | P 3 | P 6 |
| t 6 | B 4 | P 6 | P 3 | B 4 |
| t 7 | B 5 | P 6 | P 3 | B 5 |
| t 8 | P 6 ⟵ ——————— P 6 generate the virtual picture of P6 and send to second buffer | | I 9 decode I9 and store decoded I9 into third buffer | I 9 |
| t 9 | B 7 | P 6 | I 9 | B 7 |
| t 10 | B 8 | P 6 | I 9 | B 8 |
| t 11 | I 9 ⟵ ——— P̶ 1̶2̶ ——— decode P12 and store decoded P12 into first buffer | generate the virtual picture of I9 and send to second buffer | I 9 | P 12 |
| t 12 | B 10 | P 12 | I 9 | B 10 |
| t 13 | B 11 | P 12 | I 9 | B 11 |
| t 14 | P 12 ⟵ ——————— P 12 generate the virtual picture of P12 and send to second buffer | | P 15 decode P15 and store decoded P15 into third buffer | P 15 |

Fig. 4

METHOD AND AN APPARATUS FOR RECORDING A DECODED PICTURE SEQUENCE USING VIRTUAL PICTURE

This is a Continuation application of U.S. application Ser. No. 09/816,157, filed Mar. 26, 2001, now abandoned, the contents of which is expressly incorporated by reference herein in its entirety.

FIELD OF INVENTION

The present invention is related to video display systems, and more particularly, to the reordering of decode order into display order in video display systems.

BACKGROUND OF INVENTION

The CCITT/ISO committee has standardized a set of compression and decompression algorithms for still and motion digital video. These standards, including the JPEG, MPEG and H.261 compression schemes, are commonly applied in video conferencing, CD-ROM or DVD-ROM based interactive videos for education and entertainment, video, video on demand (VOD) applications, satellite video transmission applications and many other applications which require communication of motion digital video. The MPEG standard was drafted by the Moving Picture Coding Experts Group (MPEG) which operates within the framework of the Joint ISO/IEC Technical Committee (JCCI) on Information Technology. The draft provided a standard for coded representation of moving pictures, audio and their combination.

In General, motion estimation is a technique for compressing data in image processing method by estimating a motion vector. The motions within the pixels of current frame (or fields) and pixels of previous frame, in successive image signals, are transmitted as a motion vector and a difference of data between macro-blocks of the previous frame and the current frame.

In motion estimation, frames of input image signals are divided into I-pictures (Intra-coded picture), P-pictures (Predictive-coded picture), and B-pictures (Bi-directionally predicted-coded picture). The I-pictures are frames (or fields) which are coded without using motion estimation. The P-pictures are frames that perform only the forward motion estimation by using I-pictures or other P-pictures as references. The B-pictures are frames that perform the forward and backward estimation by using I-pictures or P-pictures as references. In standard MPEG 2, the so-called Group of Picture is formed from a series of image frames comprising of I-pictures, P-pictures and B pictures, such as I☐B☐B☐P☐B☐B☐P☐B☐B☐P☐B☐B☐ I . . . , the pictures are coded and transmitted to the display system for display.

The input coded (or compressed) sequence has to be decoded into decoding sequence (i.e. decode order), the order of the decode sequence is not the same as the order of display sequence (i.e. display order), hence the decode order has to be re-ordered into display order for correct display. In a common display and decode control flow, reordering is done by storing pictures of decode order into different decoding buffer, then the display system retrieves the pictures stored in different buffers according to the display order.

But under some circumstances, it is necessary to display pictures stored in one of the decoding buffer continuously, therefore the above-mentioned reordering method is not applicable. For example, the digest view function provides users with the ability to quickly preview the content of the disc(s), it is implemented by displaying simultaneously the scaled down version of previously-decoded picture with the current decoding picture in the same sequence (/or different sequences). In order to support the preview function, current decoding picture and previous-decoded picture must be stored in the one single buffer for the video output module to display the content in the display buffer continuously. Furthermore, current decoding pictures must be stored into the display buffer in accordance with the display order, which is illustrated in Table.1.

TABLE 1

| | decode order and display order | | | | | | | | | | | | | |
|---|---|---|---|---|---|---|---|---|---|---|---|---|---|---|
| | time | | | | | | | | | | | | | |
| | 1 | 2 | 3 | 4 | 5 | 6 | 7 | 8 | 9 | 10 | 11 | 12 | 13 | 14 |
| decode order | I0 | P3 | B1 | B2 | P6 | B4 | B5 | I9 | B7 | B8 | P12 | B10 | B11 | |
| display order | | I0 | B1 | B2 | P3 | B4 | B5 | P6 | B7 | B8 | I9 | B10 | B11 | P12 |

Assume the size of all buffers are the same, and the display system can scale down the decoded picture by a given scale factor such as one third or one fourth. In Table.1, after I0 is decoded and stored in one decoded buffer at time T1, P3 should be decoded and the scaled down I0 should be stored into the display buffer at time T2. When the display system finishes decoding B1 and B2, the scaled down version of P3 should be stored into display buffer thereafter. During the decoding and displaying process, the I-pictures and the P-pictures, which are used as reference pictures, will be stored twice, that is one normal size into decode buffer and the other scaled down size into display buffer. In the meantime, B-pictures will be decoded and sent to display buffer directly.

Conventional technique tackles the problem by decoding the reference pictures twice, one stored in the decoded buffer in normal size and the other stored in display buffer in scaled down size. However, it will require the system to retrieve the picture again for second decoding, which makes the decoding control scheme complicated. Another conventional technique provides additional DMA hardware with scaling function to move the pictures stored in decoded buffer to display buffer, but it requires additional hardware cost. Still another conventional technique uses system RISC to read pictures stored in the decoded buffer and write them into display buffer, the price is to cost excessive RISC I/O cycles and bring down RISC performance.

To reorder the decode order into display order, the system has to either decode the reference pictures twice, or add additional DMA hardware, or increase I/O cycles of system RISC, and sometimes the system has to contiguously display the pictures stored in one buffer. The present invention discloses a method for reordering a decode order into a display order by inserting a virtual picture, therefore minimum hardware and software cost can be achieved.

SUMMARY OF INVENTION

The present invention discloses a method and a circuit for reordering a decode order into a display order of images by inserting a virtual picture in the decode order, the decode order comprises an I-picture, a P-picture, and a B-picture. Upon receiving a compressed picture sequence, the present invention performs the following steps: (1) determining a first picture of the compressed picture sequence is an I-picture, a P-picture, or a B-picture; (2) if the first picture is I-picture, decoding the first picture and storing the decoded first picture into a first buffer; and (3) obtaining a first virtual picture according to a predetermined manner, sending the first virtual picture to a second buffer for display.

DESCRIPTION OF DRAWINGS

FIG. 4 schematically illustrates one preferred embodiment of present invention.

DETAILED DESCRIPTION OF PRESENT INVENTION

Figure 1A:
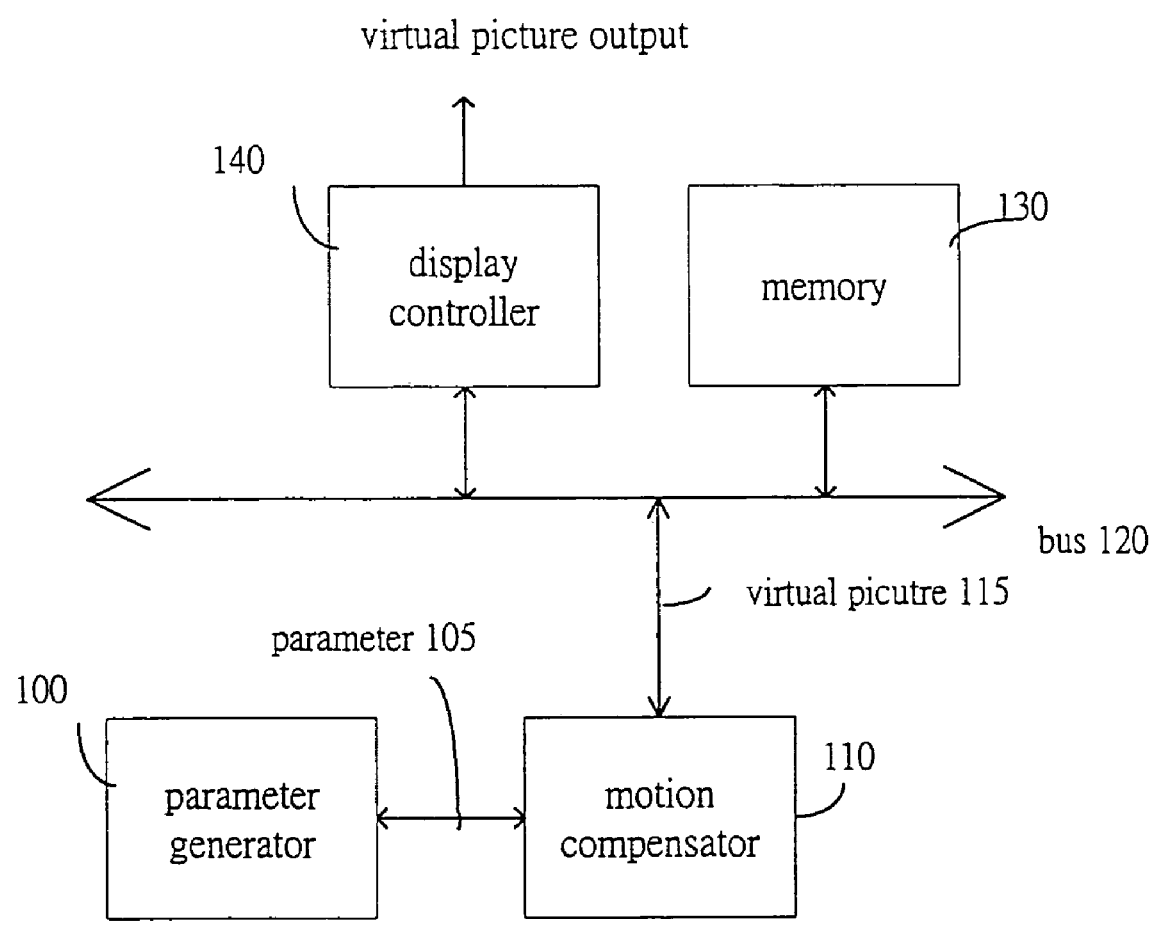
FIG. 1(a) and 1(b) schematically illustrate the circuit of present invention.

Please refer to FIG. 1(a), the present invention discloses an apparatus for reordering a decode order into a display order, comprises a parameter generator 100 for generating a parameter 105; a motion compensator 110, in response to the parameter 105, for outputting a virtual picture 115 using the first decode picture stored in the first buffer 131; a bus 120 for connecting every component in the present invention.

Figure 1B:
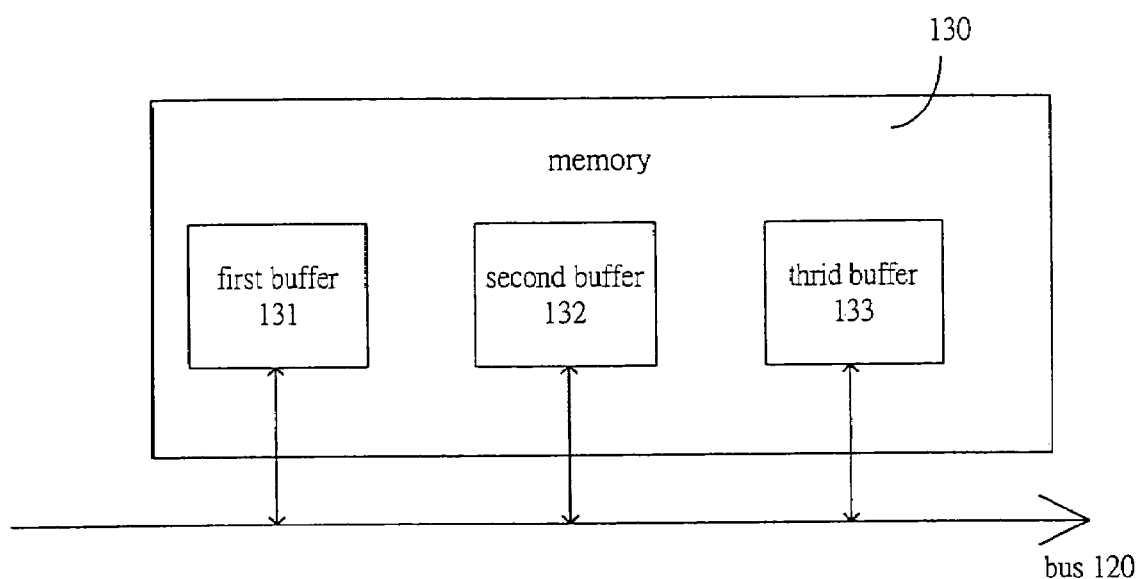

Please refer to FIG. 1(b) for detailed drawing of the memory 130, the memory 130 comprises a first buffer 131 for storing a first decoded picture of the decode order, a second buffer 132 for storing the virtual picture, and a third buffer 133 for storing a second decoded picture of the decode order.

Continuing with FIG. 1(a), the present invention comprises a display controller 140 connecting to the second buffer 132 for displaying the virtual picture 115. All the pictures are transmitted via bus 120. The display controller 140 obtains the virtual picture 115 and the original decoded pictures, performs OSD, subpicture, highlight mixing function and outputs pictures to video display machine such as TV.

It is noted that pictures in the compressed picture sequence are either frame or field type, virtual pictures are also frame or field type, the corresponding parameter 105 comprising (in MPEG2 format):

a. the picture coding type (picture_coding_type) of virtual picture is P-picture, every macro-block in a virtual picture is a skipped macro-block;

b. the prediction of the macro-blocks in a virtual frame picture should be made as if frame_motion_type is "Frame-based";

c. the prediction of the macro-blocks in a virtual field picture should be made as if field_motion_type is "Field-based";

d. motion vector is user-defined, preferably 0;

e. coded-block pattern is 0;

f. as to virtual field picture, the prediction should be made from the field of the same parity.

Preferably, the parameter 105 also comprises a scale factor, so the width and height of a virtual picture can be different from the original picture.

In the following descriptions and illustrations, blocks having the same number mean the same operation.

Figure 2:
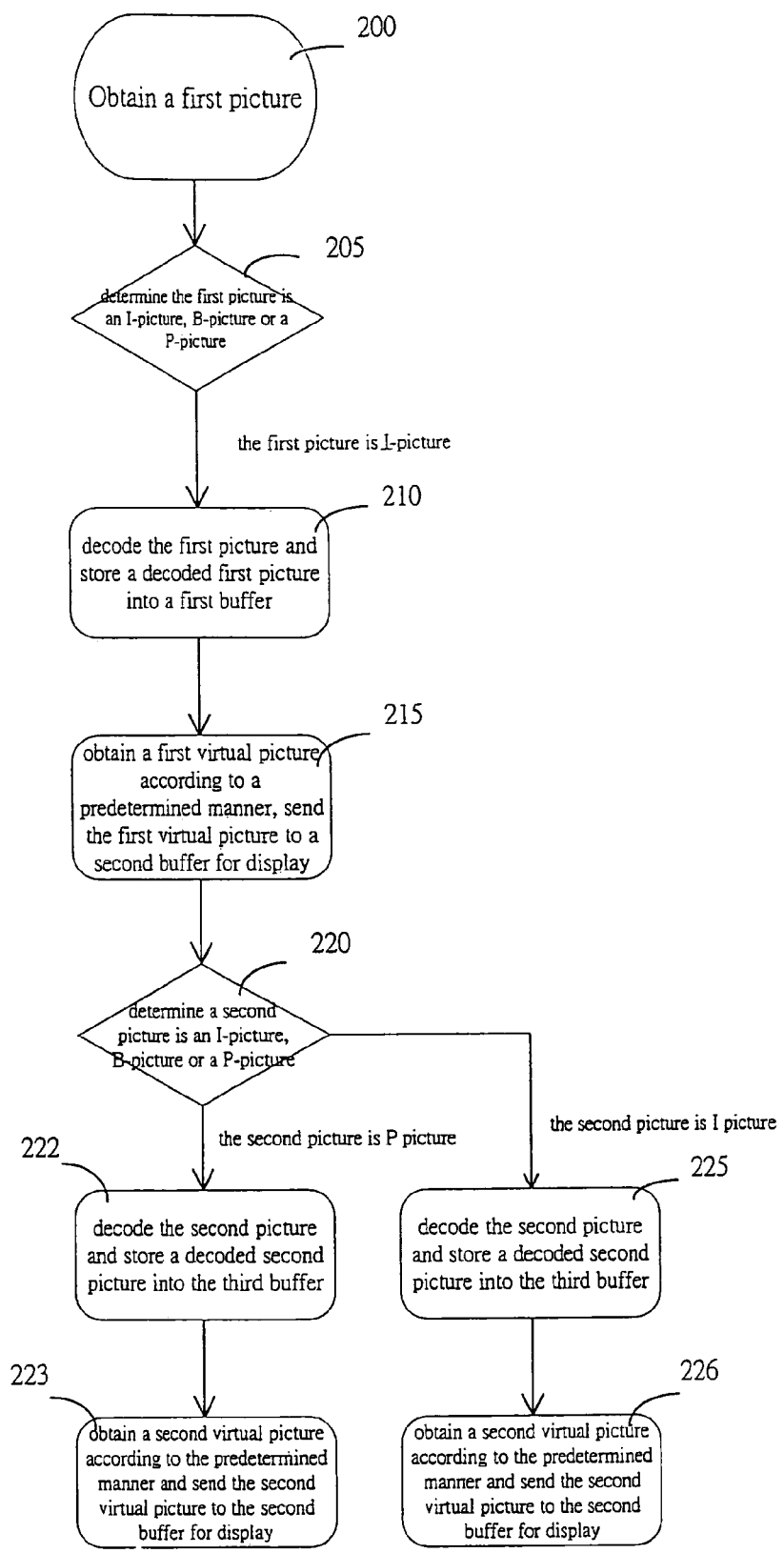
FIG. 2(a), 2(b), 3(a), and 3(b) are the flow diagrams of present invention.
Figure 2:
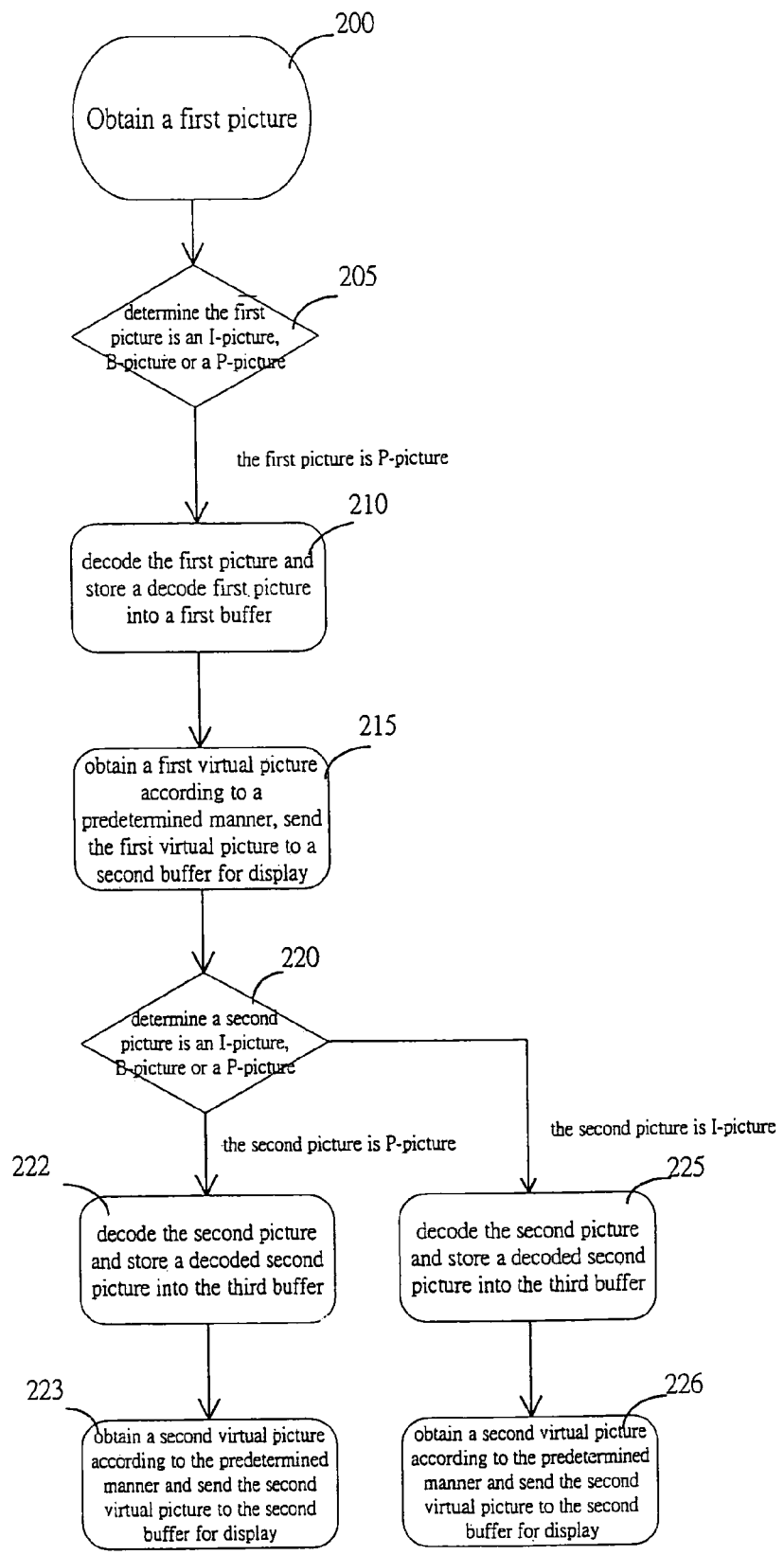

In one aspect of the present invention, please refer to FIG. 2(a), step 200 obtains a compressed picture sequence, step 205 determines a first picture in the compressed picture sequence is an I-picture, a B-picture or a P-picture, if the first picture is I-picture, step 210 decodes the first picture and stores the decoded first picture into a first buffer 131. Step 215 uses a decoded picture pre-stored in a third buffer 133, responsive to a parameter 105, generates the first virtual picture 115 and send it to a second buffer 132 for display.

The present invention further performs the following steps: step 220 determines a second picture, if the second picture is P-picture, step 222 decodes the second picture and stores the decoded second picture into a third buffer 133. Step 223 uses a decoded picture pre-stored in the first buffer 131, responsive to a parameter 105, generates the second virtual picture and send it to the second buffer 132 for display.

In step 220, if the second picture is I-picture, step 225 decodes the second picture and stores the decoded second picture into the third buffer 133. Step 226 uses a decoded picture pre-stored in the first buffer 131, responsive to the parameter 105, generates the second virtual picture and send it to the second buffer 132 for display.

In step 205, if the first picture is P-picture as shown in FIG. 2(b), the rest follows the case in which the first picture is I-picture.

Figure 3:
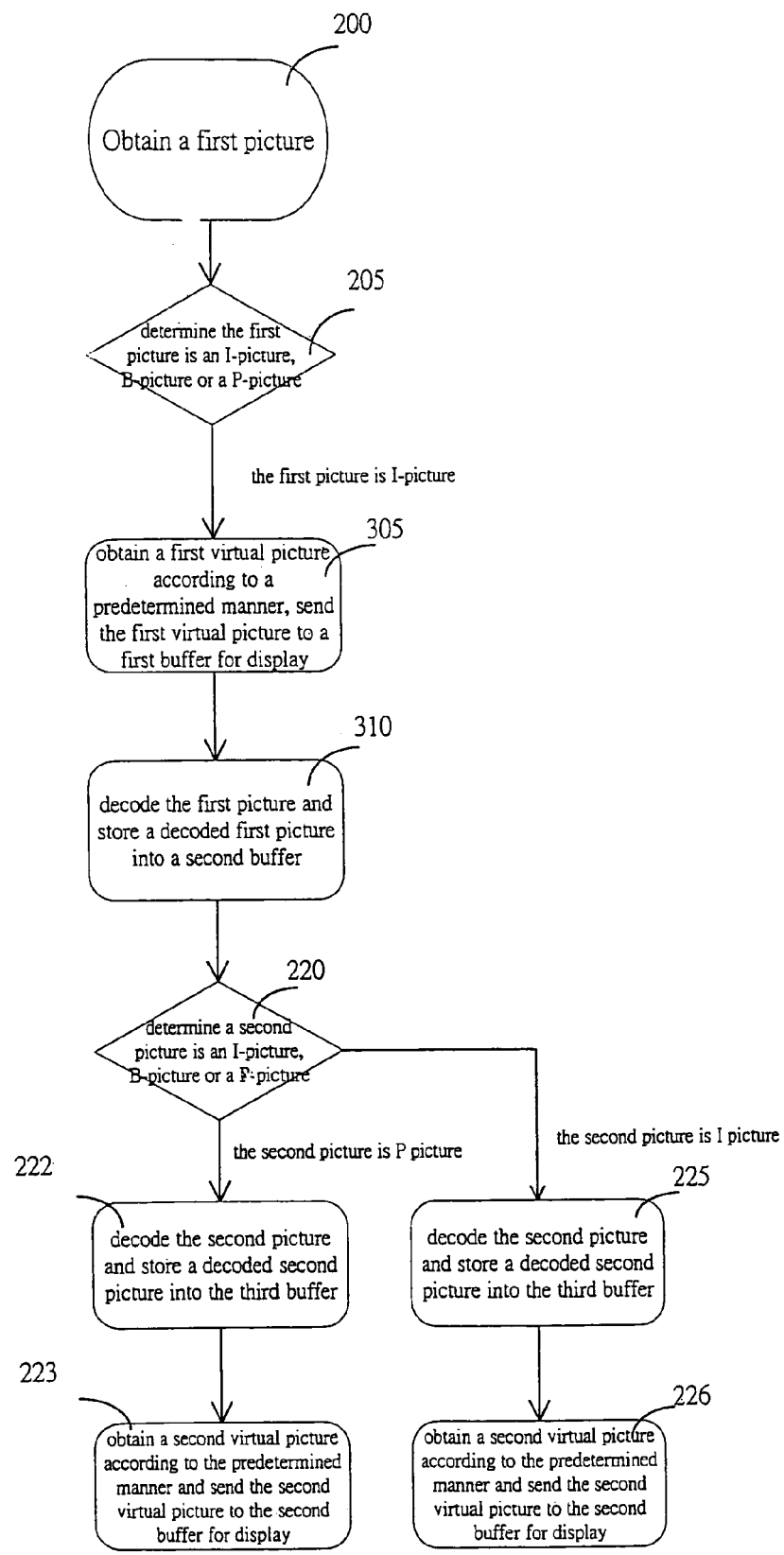
Figure 3:
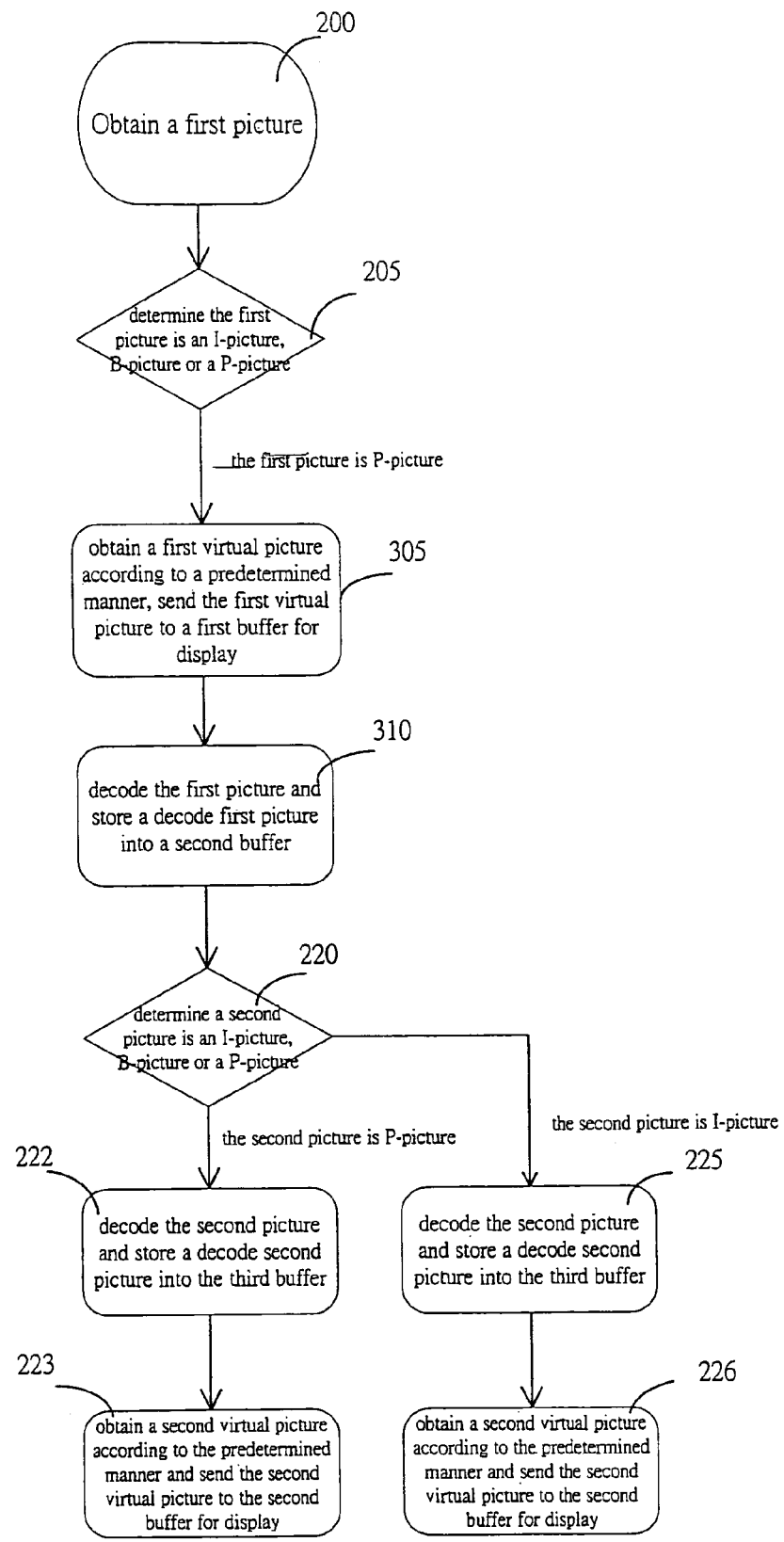

Besides, it should be noted that in FIG. 2(a), the step 210 and 215 are interchangeable, which means the present invention can generate a virtual picture 115 first then decodes the first picture, shown as step 305 and 310 of FIG. 3(a). The rest is the same as FIG. 2(a). Also in FIG. 2(a), after step 220 is done, the following step 222 and step 223 are interchangeable, step 225 and step 226 are interchangeable. The same can be applied in FIG. 3a, wherein step 222 and 223 are interchangeable, step 225 and step 226 are interchangeable.

While in FIG. 2(b), step 210 and step 215 are interchangeable, shown as step 305 and 310 of FIG. 3(b). And the step 222 and 223 in FIG. 2(b) are interchangeable, step 225 and step 226 are interchangeable. In the same way, step 222 and step 223 of FIG. 3(b) are interchangeable, whereas step 225 and step 226 in FIG. 3(b) are interchangeable.

Please refer to FIG. 4, in one preferred embodiment of the present invention, upon receiving picture P6, decode picture P6 and store the decoded picture P6 into first buffer 131. In response to the parameter 105, generate a virtual picture using P3 stored in the third buffer 133, send the virtual picture to the second buffer 132. Subsequently, decode the received B4 and B5, send the decoded B4 and B5 directly to the second buffer 132, the display controller 140 will use the pictures stored in the second buffer 132 for display. The next picture received is I9, decode I9 and store the decoded I9 in the third buffer 133, also in response to the parameter 105, generate a virtual picture using P6 stored in the third buffer 131, send the virtual picture to the second buffer 132. The following B7 and B8 will be decoded, and the decoded B7 and B8 will be sent to the second buffer 132 directly, the display controller 140 uses the pictures stored in the second buffer 132 for display thereafter.

Continuing with FIG. 4, when P12 is received, decode picture P12 and store the decoded picture P12 into first buffer 131. In response to the parameter 105, generate a virtual picture using I9 stored in the third buffer 133, send the virtual picture to the second buffer 132. Subsequently, decode the received B10 and B11, send the decoded B10 and B11 directly to the second buffer 132, the display controller 140 will use the pictures stored in the second buffer 132 for display. The next picture received is P15, decode P15 and store the decoded P15 in the third buffer 133, then in response to the parameter 105, generate a virtual picture using P12 stored in the third buffer 131, send the virtual picture to the second buffer 132.

Please refer to Table.2, which illustrates how to use virtual pictures to reorder the decode order and the display order.

TABLE 2 decode order and display order (with virtual pictures inserted)

| | time | | | | | | |
|---|---|---|---|---|---|---|---|
| | 1 | 2 | 3 | 4 | 5 | 6 | 7 |
| Decode order | I0 | (I0_vp) ☐ P3 | B1 | B2 | (P3_vp) ☐ P6 | B4 | B5 |
| Display order | | I0 | B1 | B2 | P3 | B4 | B5 |

| | time | | | | | | |
|---|---|---|---|---|---|---|---|
| | 8 | 9 | 10 | 11 | 12 | 13 | 14 |
| Decode order | (P6_vp) ☐ I9 | B7 | B8 | (I9_vp) ☐ P12 | B10 | B11 | (P12_vp) ☐ P15 |
| Display order | P6 | B7 | B8 | I9 | B10 | B11 | P12 |

While in Table.2, the motion compensator 110 is treated as a special DMA channel by moving data directly between different buffers to create virtual picture. Besides, it should be noted that whenever the present invention starts to decode a reference picture (I-picture or P-picture), the present invention will stored the received picture in the first or the third buffer and override the older data stored in the first or the third buffer. Please refer to FIG. 4, when P6 is received, it will be stored in the buffer where originally I0 is stored, not the buffer where P3 is stored.

The present invention uses the motion compensator 110 to generate the virtual picture, all operations can be completed by motion compensator 110 itself. Thus avoiding the need for additional DMA hardware, or increasing I/O cycles of the RISC, and the complexity and the cost of hardware and software design can be reduced.

It will be apparent to those skilled in the art that various modifications and variations can be made in the present invention without departing from the spirit or scope of the invention. Thus, it is intended that the present invention covers the modification and variations of this invention provided they come within the scope of the appended claims and their equivalents.

The invention claimed is:

1. A video decoder for decoding encoded video data and generating decoded pictures and a virtual picture, comprising:
    a memory for storing at least one of the decoded pictures;
    a parameter generator for generating a virtual picture parameter, the virtual picture parameter being not generated by decoding the encoded video data;
    a motion compensator for receiving the virtual picture parameter, retrieving at least one of the decoded pictures stored in the memory, and generating the virtual picture accordingly;
    wherein the virtual picture parameter is directly sent to and applied by the motion compensator without further decoding.

2. The video decoder of claim 1, wherein the decoded pictures include a reference picture and a non-reference picture, and the non-reference picture is not referred to by any other pictures when the video data is encoded.

3. The video decoder of claim 2, wherein the motion compensator receives the virtual picture parameter, retrieves the reference picture stored in the memory, and generates the virtual picture accordingly.

4. The video decoder of claim 1, wherein the decoded pictures includes at least two reference pictures and a non-reference picture, the non-reference pictures are not referred to by any other pictures when the video data is encoded, and, the memory comprises a first buffer and a second buffer for alternatively storing the reference pictures.

5. The video decoder of claim 4, wherein the motion compensator receives the virtual picture parameter, retrieves at least one of the reference pictures stored in the first buffer, and generates the virtual picture accordingly.

6. The video decoder of claim 4, wherein the motion compensator receives the virtual picture parameter, retrieves at least one of the reference pictures stored in the first buffer, retrieves at least one of the reference pictures stored in the second buffer, and generates the virtual picture accordingly.

7. The video decoder of claim 1, wherein the virtual picture parameter includes a scale factor determining a size of the virtual picture.

8. The video decoder of claim 1, wherein the encoded video data is encoded in accordance with an MPEG standard.

9. The video decoder of claim 8, wherein the virtual picture parameter includes a motion vector as defined in the MPEG standard.

10. The video decoder of claim 9, wherein the motion vector has a value of zero.

11. The video decoder of claim 8, wherein the virtual picture parameter includes a coded-block pattern as defined in the MPEG standard.

12. The video decoder of claim 11, wherein the coded-block pattern has a value of zero.

13. The video decoder of claim 8, wherein the virtual picture parameter includes a picture coding type (picture_coding_type) as defined in the MPEG standard.

14. The video decoder of claim 13, wherein the picture coding type indicates the virtual picture as a P picture as defined in the MPEG standard.

15. The video decoder of claim 8, wherein the virtual picture comprises a plurality of macro-blocks, and each macro-block is a skipped macro-block as defined in the MPEG standard.

16. The video decoder of claim 2, wherein the reference picture is one of an I picture and a P picture, and the non-reference picture is a B picture.

17. A video reproduction apparatus for decoding an encoded video data and generating reference pictures and non-reference pictures in accordance with a decode order, and for displaying the reference pictures and the non-reference pictures in accordance with a display order, the non-reference pictures being not referred to by any other pictures when the video data is encoded, the video reproduction apparatus comprising:
    a first buffer and a second buffer alternatively storing the reference pictures in accordance with the decode order, wherein said first and second buffers only store reference pictures;

a third buffer storing one of a retrieved reference picture and the non-reference picture;

a display controller connected to the third buffer, and displaying the retrieved reference picture or the non-reference picture in accordance with the display order;

a controller retrieving the reference picture stored in one of the first buffer and the second buffer, and storing the retrieved reference picture into the third buffer whenever the reference picture is to be displayed by the display controller in accordance with the display order.

18. The video reproduction apparatus of claim 17, wherein the controller further comprises:

a parameter generator for generating a virtual picture parameter, the virtual picture parameter being not generated by decoding the encoded video data; a motion compensator for receiving the virtual picture parameter, retrieving a reference picture stored in one of the first buffer and the second buffer, and storing the retrieved reference picture into the third buffer accordingly whenever the reference picture is to be displayed by the display controller in accordance with the display order.

19. The video reproduction apparatus of claim 17, wherein the virtual picture parameter includes a zero-valued motion vector as defined in the MPEG standard.

20. The video reproduction apparatus of claim 17, wherein the virtual picture parameter includes a zero-valued coded-block pattern as defined in the MPEG standard.

21. The video reproduction apparatus of claim 17, wherein the reference pictures are I pictures and P pictures, the non-reference pictures are B pictures, the I pictures are encoded without using motion estimation, the P pictures are encoded using forward motion estimation referring to the I pictures or other P pictures, and the B pictures are encoded using forward and backward motion estimation referring to the I pictures or the P pictures.

22. A method for decoding and displaying an encoded video data in a video reproduction device, the video reproduction device being capable of decoding the encoded video data and generating reference pictures and non-reference pictures in accordance with a decode order, and displaying the reference pictures and the non-reference pictures in accordance with a display order, the non-reference pictures being not referred to by any other pictures when the video data is encoded, the video reproduction device comprising a first buffer, a second buffer, and a third buffer, the method comprising the steps of:

(a) decoding the encoded video data and generating the reference pictures and the non-reference pictures in accordance with the decode order;

(b) alternatively storing a decoded picture into the first buffer or the second buffer if the decoded picture is the reference picture, wherein said first and second buffers only store reference pictures; and storing the decoded picture into the third buffer if the decoded picture is the non-reference picture;

(c) retrieving the reference picture stored in one of the first buffer and the second buffer, and storing the retrieved reference picture into the third buffer whenever the reference picture is to be displayed in accordance with the display order; and (d) displaying the retrieved reference picture or the non-reference picture stored in the third buffer in accordance with the display order.

23. The method of claim 22, wherein the step (c) further comprises the steps of:

(c1) providing a virtual picture parameter; the virtual picture parameter being not generated by decoding the encoded video data;

(c2) generating the retrieved reference picture in accordance with the virtual picture parameter by retrieving the reference pictures stored in one of the first buffer and the second buffer, and storing the retrieved reference picture into the third buffer whenever the reference picture is to be displayed in accordance with the display order.

* * * * *